(12) United States Patent
Finkelstein et al.

(10) Patent No.: US 11,423,013 B2
(45) Date of Patent: Aug. 23, 2022

(54) TRANSACTIONS ON NON-TRANSACTIONAL DATABASE

(71) Applicant: eBay Inc., San Jose, CA (US)

(72) Inventors: Yuri Finkelstein, San Carlos, CA (US); Harihara Subramanian Kadayam, Fremont, CA (US)

(73) Assignee: eBay Inc., San Jose, CA (US)

( * ) Notice: Subject to any disclaimer, the term of this patent is extended or adjusted under 35 U.S.C. 154(b) by 566 days.

(21) Appl. No.: 16/426,882

(22) Filed: May 30, 2019

(65) Prior Publication Data
US 2020/0379976 A1 Dec. 3, 2020

(51) Int. Cl.
*G06F 16/23* (2019.01)
*G06F 7/14* (2006.01)
*G06F 12/02* (2006.01)

(52) U.S. Cl.
CPC ............ *G06F 16/2379* (2019.01); *G06F 7/14* (2013.01); *G06F 12/0253* (2013.01); *G06F 2212/1044* (2013.01); *G06F 2212/163* (2013.01)

(58) Field of Classification Search
CPC .............................. G06F 16/2379; G06F 7/14
See application file for complete search history.

(56) References Cited

U.S. PATENT DOCUMENTS

| | | | | |
|---|---|---|---|---|
| 5,287,496 A * | 2/1994 | Chen | .................... | G06F 16/2329 707/999.203 |
| 6,295,610 B1 * | 9/2001 | Ganesh | ................ | G06F 11/1474 714/E11.131 |
| 2014/0136788 A1 * | 5/2014 | Faerber | ............. | G06F 17/30315 711/133 |
| 2014/0279962 A1 * | 9/2014 | Schreter | .............. | G06F 16/1724 707/693 |
| 2014/0281212 A1 * | 9/2014 | Schreter | ................ | G06F 3/0635 711/112 |
| 2016/0092478 A1 * | 3/2016 | Dietterich | ........... | G06F 12/0253 707/692 |
| 2018/0349374 A1 * | 12/2018 | Gurajada | ............ | G06F 12/0253 |
| 2018/0349430 A1 * | 12/2018 | Lee | ......................... | G06F 16/28 |
| 2019/0163579 A1 * | 5/2019 | Pothoff | ............... | G06F 16/2379 |

OTHER PUBLICATIONS

Microsoft Books Online for MicrosoftSQL Server 2014, Microsoft, 2015, 240 pages.
Ashdown et al., Oracle Database Concepts 12c Release 1 (12.1), Oracle, Jul. 2017, 656 pages.

* cited by examiner

*Primary Examiner* — Eliyah S. Harper
(74) *Attorney, Agent, or Firm* — Holland & Hart LLP

(57) ABSTRACT

Disclosed are systems, methods, and non-transitory computer-readable media for an improved database management system that provides database transactions on a non-transactional database. The database management system executes garbage collection on data stored in a database to remove data values written to the database as part of uncommitted transactions. Each uncommitted transaction is associated with a respective transaction identifier that is not included in a list of committed transaction identifiers. The list of committed transaction identifiers lists, in sequential order, transaction identifiers for committed transaction. After removing each data value written to the database as part of an uncommitted transaction, the database management system modifies the list of committed transaction identifiers to include the transaction identifier for the uncommitted transaction.

20 Claims, 9 Drawing Sheets

TRANSACTIONS ON NON-TRANSACTIONAL DATABASE

TECHNICAL FIELD

An embodiment of the present subject matter relates generally to database management systems and, more specifically, to an improved database management system that provides database transactions on a non-transactional database.

BACKGROUND

Database management system provide users with the ability to perform operations on data stored within a database. For example, a user may perform operations such as read, write, etc. A transactional database is a type of database that provides for execution of database transactions on data stored in the database. A database transaction is a single transaction made up one or more individual operations that must either all succeed, or none succeed. For example, if a database transaction includes two separate write commands, the two write commands must either be both successfully executed or neither executed. In the event that only one of the two write commands is performed successfully, the transactional database reverses or ignores the other successfully executed operation, resulting in neither of the write commands being performed. While some databases allow for database transactions, some databases do not (i.e., non-transactional databases). Providing for transactions using non-transactional databases is difficult. Accordingly, improvements are needed.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
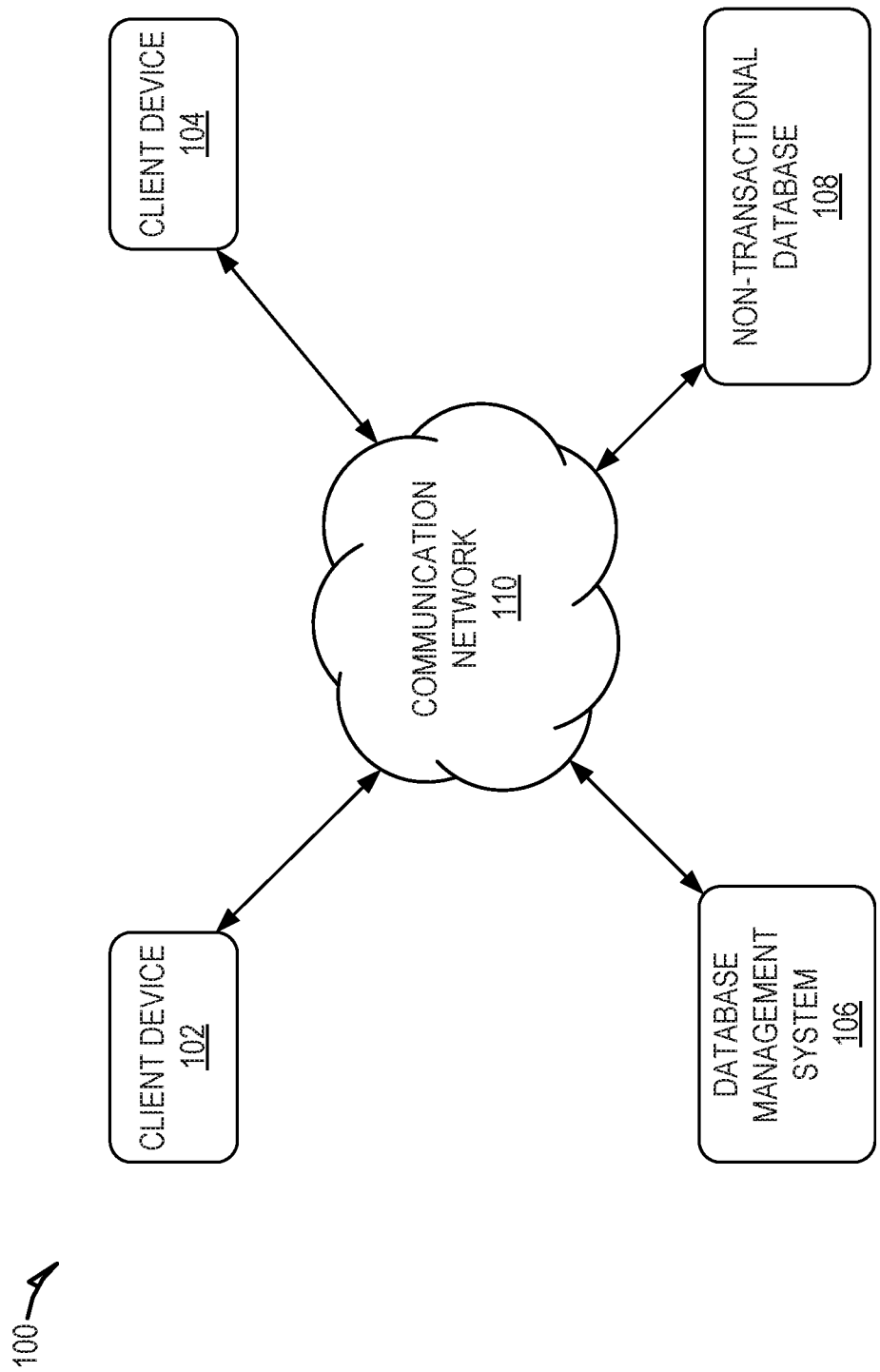
FIG. 1 shows an example system configuration, wherein a database management system provides database transactions on a non-transactional database, according to some example embodiments.

In the following description, for purposes of explanation, various details are set forth in order to provide a thorough understanding of some example embodiments. It will be apparent, however, to one skilled in the art, that the present subject matter may be practiced without these specific details, or with slight alterations.

Reference in the specification to "one embodiment" or "an embodiment" means that a particular feature, structure, or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

Disclosed are systems, methods, and non-transitory computer-readable media for an improved database management system that provides database transactions on an underlying non-transactional database. For example, the database management system provides database transactions on a non-transactional database by using a transaction identifier (ID) list to identify the database transactions that have been committed. A database transaction is deemed committed if each of the individual operations of the database transaction is executed successfully. The database management system generates a transaction ID for each requested database transaction and adds the transaction ID to the transaction ID list if the database transaction is deemed committed. Transaction IDs for database transactions that are not successfully committed (e.g., at least one operation of the database transaction failed) are not added to the transaction ID list. Using the transaction ID list as described provides the benefit of eliminating the need to pre-commit the database transaction. This reduces the number of overall operations performed by the data management system, thereby improving performance.

While effective, this technique can be resource intensive. The database management system may employ techniques to reduce the number of requests to the transaction ID list and limit the size of the transaction ID list itself. For example, the database management system batches transaction IDs for committed transactions during a period of time and writes the batched transaction IDs to the transaction ID list at once, as opposed to writing each transaction ID to the transaction ID list as each database transactions is successfully committed. This allows the database management system to group continuous sequential transaction IDs into a single entry in the transaction ID list. The transaction IDs assigned to database transactions may be generated in sequential order (e.g., 1, 2, 3, 4, etc.). The database management system identifies continuous sequential transaction IDs received during a period of time and writes them to the transaction ID list as a single entry that indicates the range of continuous sequential transaction IDs. For example, rather than creating separate entries for transaction IDs 1, 2 and 3, the database management system may create a single entry for the range of transaction IDs 1-3. As a result, the database management system minimizes the number of individual write requests to the transaction ID list, as well as reduces the number of entries in the transaction ID list. For example, the database management system performs a single write command to add the entry for the range of transaction IDs (e.g., 1-3) rather than executing separate write commands for each entry in the range of transaction IDs (e.g., 1, 2 and 3).

While creating single entries for a range of committed transaction IDs reduces the number of entries in the transaction ID list, the size of the transaction ID list will continue to grow over time. For example, gaps in the ranges of committed transaction IDs caused by uncommitted transaction IDs (e.g., transaction IDs for uncommitted database transactions) result in separate entries in the transaction ID list. As a result, the size of the transaction ID list continues to grow over time. Accordingly, the database management system may add uncommitted transaction IDs to the transaction ID list to remove the gaps between entries. That is, the database management system may combine two or more entries in the transaction ID list into a single entry that includes uncommitted transaction IDs for uncommitted database transactions. For example, an entry for transaction IDs 1-3 can be combined with an entry for transaction IDs 5-7 by adding the uncommitted transaction ID 4 to the transaction ID list. The resulting entry for transaction IDs 1-7 includes the uncommitted transaction ID 4, which corresponds to an uncommitted database transaction.

To add uncommitted transaction IDs to the transaction ID list without issue, the database management system first deletes all versions of data associated with the uncommitted transaction ID from the database. This ensures that the transaction ID list will no longer be queried for the uncommitted transaction ID. To accomplish this, the database management system executes a garbage collection of the database to delete all versions of data associated with a set of uncommitted transaction IDs. Once the garbage collection has been completed, the database management system may then add the set of uncommitted transaction IDs to the transaction ID list and consolidate entries in the transaction ID list. As a result, all transaction IDs in the transaction ID list up to a specified point can be consolidated into a single entry, thereby greatly reducing the size of the transaction ID list.

FIG. 1 shows an example system 100 configuration, wherein a database management system 106 provides database transactions on a non-transactional database 108, according to some example embodiments. As shown, multiple devices (i.e., client device 102, client device 104, database management system 106, and non-transactional database 108) are connected to a communication network 110 and configured to communicate with each other through use of the communication network 110. The communication network 110 is any type of network, including a local area network (LAN), such as an intranet, a wide area network (WAN), such as the internet, or any combination thereof. Further, the communication network 110 may be a public network, a private network, or a combination thereof. The communication network 110 is implemented using any number of communication links associated with one or more service providers, including one or more wired communication links, one or more wireless communication links, or any combination thereof. Additionally, the communication network 110 is configured to support the transmission of data formatted using any number of protocols.

Multiple computing devices can be connected to the communication network 110. A computing device is any type of general computing device capable of network communication with other computing devices. For example, a computing device can be a personal computing device such as a desktop or workstation, a business server, or a portable computing device, such as a laptop, smart phone, or a tablet personal computer (PC). A computing device can include some or all of the features, components, and peripherals of the machine 900 shown in FIG. 9.

To facilitate communication with other computing devices, a computing device includes a communication interface configured to receive a communication, such as a request, data, and the like, from another computing device in network communication with the computing device and pass the communication along to an appropriate module running on the computing device. The communication interface also sends a communication to another computing device in network communication with the computing device.

In the system 100, users communicate with and utilize the functionality of the database management system 106 by using the client devices 102 and 104 that are connected to the communication network 110 by direct and/or indirect communication. The database management system 106 provides functionality that enables users to access, modify and add data stored in the non-transactional database 108. This includes performing database transactions including a set of individual operations (e.g., write commands) that either are all successfully executed, or none are executed.

Although the shown system 100 includes only two client devices 102, 104, this is only for ease of explanation and is not meant to be limiting. One skilled in the art would appreciate that the system 100 can include any number of client devices 102, 104. Further, the database management system 106 may concurrently accept connections from and interact with any number of client devices 102, 104. The database management system 106 supports connections from a variety of different types of client devices 102, 104, such as desktop computers; mobile computers; mobile communications devices, e.g., mobile phones, smart phones, tablets; smart televisions; set-top boxes; and/or any other network enabled computing devices. Hence, the client devices 102 and 104 may be of varying type, capabilities, operating systems, and so forth.

A user interacts with the database management system 106 via a client-side application installed on the client devices 102 and 104. In some embodiments, the client-side application includes a component specific to the database management system 106. For example, the component may be a stand-alone application, one or more application plug-ins, and/or a browser extension. However, the users may also interact with the database management system 106 via a third-party application, such as a web browser, that resides on the client devices 102 and 104 and is configured to communicate with the database management system 106. In either case, the client-side application presents a user interface (UI) for the user to interact with the database management system 106. For example, the user interacts with the database management system 106 via a client-side application integrated with the file system or via a webpage displayed using a web browser application.

The database management system 106 is comprised of one or more computing devices configured to provide for the storage, retrieval, and updating of data in a computer system. For example, the database management system 106 provides an interface that enables users to store, retrieve and update data in the non-transactional database 108. The non-transactional database 108 is a database that is not itself configured to provide for database transactions in which each operation of the transaction is either successfully executed, or none are executed.

The database management system 106 provides for database transactions using the non-transactional database 108 through use of transaction IDs and a transaction ID list. The database management system 106 generate a unique transaction ID for each requested database transaction and stores the transaction ID along with each executed operation of the database transaction. For example, given an operation to modify a data value in the non-transactional database 108, the database management system 106 writes a new version of the data value to the non-transactional database 108 and associates the new version of the data value with the transaction ID generated for the database transaction. The database management system 106 adds the transaction ID for the database transaction to the transaction ID list if the database transaction is deemed committed (e.g., each operation of the database transaction is successfully executed). Transaction IDs for database transactions that are not successfully committed (e.g., at least one operation of the database transaction failed) are not added to the transaction ID list. Accordingly, the database management system 106 uses the transaction IDs associated with each stored version of a data item to search the transaction ID list and determine the most recent version of the data item that was successfully committed.

The database management system 106 may be configured to minimize the number of requests made to the transaction ID list and the size of the transaction ID list itself. For example, the database management system 106 batches transaction IDs for committed transactions during a period of times and writes the batched transaction IDs to the transaction ID list at once, as opposed to writing each transaction ID to the transaction ID list as each database transactions is successfully committed. This allows the database management system 106 to group continuous sequential transaction IDs into a single entry in the transaction ID list. The transaction IDs assigned to database transactions may be generated in sequential order (e.g., 1, 2, 3, 4, etc.). The database management system 106 identifies continuous sequential transaction IDs received during a period of time and writes them to the transaction ID list as a single entry that indicates the range of continuous sequential transaction IDs. For example, rather than creating separate entries for transaction IDs 1, 2 and 3, the database management system 106 may create a single entry for the range of transaction IDs 1-3. As a result, the database management system 106 reduces the number of individual write requests to the transaction ID list, as well as reduces the number of entries in the transaction ID list.

While creating single entries for a range of committed transaction IDs reduces the number of entries in the transaction ID list, the size of the transaction ID list will continue to grow over time. For example, gaps in the ranges of committed transaction IDs caused by uncommitted transaction IDs (e.g., transaction IDs for uncommitted database transactions) result in separate entries in the transaction ID list. As a result, the size of the transaction ID list continues to grow over time. Accordingly, the database management system 106 may add uncommitted transaction IDs to the transaction ID list to remove the gaps between entries. That is, the database management system 106 may combine two or more entries in the transaction ID list into a single entry that includes uncommitted transaction IDs for uncommitted database transactions. For example, an entry for transaction IDs 1-3 can be combined with an entry for transaction IDs 5-7 by adding the uncommitted transaction ID 4 to the transaction ID list. The resulting entry for transaction IDs 1-7 includes the uncommitted transaction ID 4, which corresponds to an uncommitted database transaction.

To add uncommitted transaction IDs to the transaction ID list without issue, the database management system 106 first deletes all versions of data values from the non-transactional database 108 that are associated with the uncommitted transaction ID from the database. This ensures that the transaction ID list will no longer be queried for the uncommitted transaction ID. To accomplish this, the database management system 106 executes a garbage collection of the non-transactional database 108 to delete all versions of data items associated with a set of uncommitted transaction IDs. Once the garbage collection has been completed, the database management system 106 may then add the set of uncommitted transaction IDs to the transaction ID list and consolidate entries in the transaction ID list. As a result, all transaction IDs in the transaction ID list up to a given value can be consolidated into a single entry, thereby greatly reducing the size of the transaction ID list.

Figure 2:
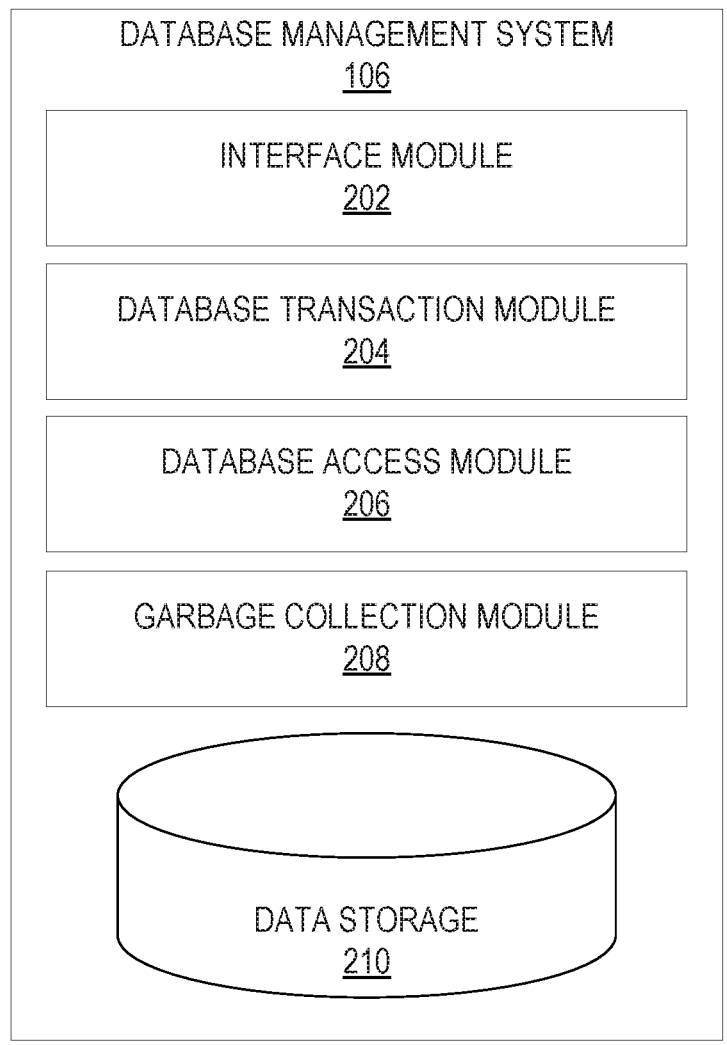
FIG. 2 is a block diagram of the database management system, according to some example embodiments.

FIG. 2 is a block diagram of the database management system 106, according to some example embodiments. To avoid obscuring the inventive subject matter with unnecessary detail, various functional components (e.g., modules) that are not germane to conveying an understanding of the inventive subject matter have been omitted from FIG. 2. However, a skilled artisan will readily recognize that various additional functional components may be supported by the database management system 106 to facilitate additional functionality that is not specifically described herein. Furthermore, the various functional modules depicted in FIG. 2 may reside on a single computing device or may be distributed across several computing devices in various arrangements such as those used in cloud-based architectures.

As shown, the database management system 106 includes, an interface module 202, a database transaction module 204, a database access module 206, a garbage collection module 208, and data storage 210.

The interface module 202 provides a user interface that enables users to communicate with and utilize the functionality of the database management system 106. For example, the interface module 202 provides a user interface on a display of a user's client device 102. The user interface may present data on the display, such as data values retrieved from the non-transactional database 108. The user interface also includes user interface elements (e.g., buttons, text boxes, etc.) that the user may use to utilize the functionality of the database management system 106. For example, the user may use the interface elements to enter requests to access, modify, store, etc., data in the non-transactional database 108. The user may also use the user interface to request database transactions. A database transaction is a single request including multiple operations (e.g., write command) that are either all successfully executed, or none are executed.

The database transaction module 204 executes database transactions. For example, the database transaction module 204 generates a transaction ID for each requested database transaction, identifies the individual operations included in the database transaction, and attempts to execute the individual operations on the non-transactional database 108.

Each transaction ID is a unique value (e.g., number) that is generated for and assigned to each new database transaction. The database transaction module 204 may generate the transaction IDs in increasing sequential order, such as by increasing the value by one predetermined increment value (e.g., 1, 2, 3, 3, etc.) for each new database transaction.

The database transaction module 204 adds the transaction ID assigned to a database transaction to each updated version of a data value in the non-transactional database 108 that results from a successfully executed operation of the database transaction. For example, if a database transaction includes an operation to change a data value (e.g., number) in the non-transactional database 108, the database transaction module 204 attempts to write a new version of the data in the non-transactional database 108. The previous versions of the data values are not affected or overwritten during this process, rather the database transaction module 204 adds a new version of the data value that includes the transaction ID for the corresponding database transaction. As a result, the non-transactional database 108 may include multiple versions of a data value.

If the database transaction module 204 successfully executes each operation of the database transaction, the database transaction module 204 adds the transaction ID for the database transaction (e.g., committed transaction ID) to the transaction ID list. The transaction ID list is stored in the data storage 210 and includes a listing of all committed transaction IDs. A committed transaction is a database transaction in which each operation of the database transaction was successfully executed by the database transaction module 204. Alternative, if any operation of a database transaction is not successfully executed, for example as the result of an error, the database transaction module 204 does not add the transaction ID for the uncommitted transaction (e.g., uncommitted transaction ID) to the transaction ID list. This signifies that the database transaction was not committed.

The database transaction module 204 adds a committed transaction ID to the transaction ID list by communicating with the data storage 210 to access the transaction ID list. The database transaction module 204 adds a new entry in the transaction ID list that includes the committed transaction ID. The transaction IDs added to the transaction ID list may be stored in sequential order, such as from a lowest value transaction ID to a highest value transaction ID. The database transaction module 204 may add the entry for the committed transaction ID based on the sequential ordering.

In some embodiments, the database transaction module 204 batches committed transaction IDs during a period of time. That is, the database transaction module 204 determines a set of transaction IDs for database transactions that are committed during the period of time and then writes each of the committed transaction IDs to the transaction ID list at once. This contrasts with writing each committed transaction ID to the transaction ID list individually as each individual database transaction is successfully committed. This allows the database transaction module 204 to group sequentially continuous transaction IDs for committed transaction into a single entry in the transaction ID list. Sequentially continuous transactions IDs are a set of two or more transaction IDs that are sequential in order without any intervening transaction IDs that are not included in the set. Sequentially continuous transaction IDs (e.g., 1, 2, 3) may be added as a single entry that indicates the continuous range of the transaction IDs (e.g., 1-3). As a result, the database transaction module 204 performs fewer write requests to the transaction ID list and the number of entries in the transaction ID list is reduced.

The database access module 206 accesses data from the non-transactional database 108. An example of accessing data is executing a read command to return a data value from the non-transactional database 108. As explained, the non-transactional database 108 may maintain multiple versions of a data value. Rather than deleting or writing over a previous version of a data item when modifying the data value, the database transaction module 204 adds a new version of the data value along with its corresponding transaction ID to the non-transactional database 108.

The database access module 206 accesses any existing versions of the requested data value and determines which version of the data value should be returned. For example, the database access module 206 determines which version of the data value is the most recent version that is associated with a committed transaction ID. To determine whether a version of a data value is associated with a committed transaction ID, the database access module 206 searches the transaction ID list for the transaction ID associate with the version of the data value. If the transaction ID is included in the transaction ID list, the database access module 206 determines that the version of the data value associated with a committed transaction ID. Alternatively, if transaction ID associated with a version of a data value is not included in the transaction ID list, the database access module 206 determines that the version of the data value is not associated with a committed transaction ID.

The database access module 206 may perform this query in reverse sequential order such that the database access module 206 searches the transaction ID list for the transaction ID associated with the most recent version of the data value and continues on to each previous version of the data value until a version of the data value that is associated with a committed transaction ID is found.

The garbage collection module 208 performs garbage collection on the data values stored in the non-transactional database 108. Garbage collection is the process of deleting versions of data values in the non-transactional database 108 that are not needed. For example, versions of data values that are associated with uncommitted transactions may be periodically deleted to reduce and reclaim the data used by the non-transactional database 108. The garbage collection module 208 searches the non-transactional database 108 for versions of data values that are associated with uncommitted transaction IDs and deletes them.

To avoid deleting versions of data values that are associated with database transactions that are still being processed, the garbage collection module 208 may limit garbage collection to a given set of transaction IDs. For example, the garbage collection module 208 may search the transaction ID list to identify a set of uncommitted transaction IDs or select a maximum transaction ID value for the garbage collection. The garbage collection module 208 may limit the garbage collection process to the set of uncommitted transaction IDs of transaction IDs that do not exceed the maximum transaction ID value. That is, the garbage collection module 208 may search the non-transactional database 108 for versions of data values associated with transaction IDs included in the identified set of uncommitted transaction IDs or uncommitted transaction IDs that do not exceed the maximum transaction ID value, and deletes them.

After completing garbage collection, the garbage collection module 208 may modify the transaction ID list to include the set of uncommitted transaction IDs that were deleted during the garbage collection. Uncommitted transaction IDs result in gaps in the transaction ID list. The garbage collection module 208 adds uncommitted transaction IDs to the transaction ID list after completing a garbage collection so that these gaps can be removed from the transaction ID list. As a result, multiple entries in the transaction ID list may be consolidated into a single entry, thereby greatly reducing the size of the transaction ID list. Adding the uncommitted transaction IDs to the transaction ID list may be performed after the garbage collection is completed and all versions of data values associated with the uncommitted transaction IDs have been deleted. Accordingly, the transaction ID list will no longer be queried for the uncommitted transaction IDs.

Figure 3:
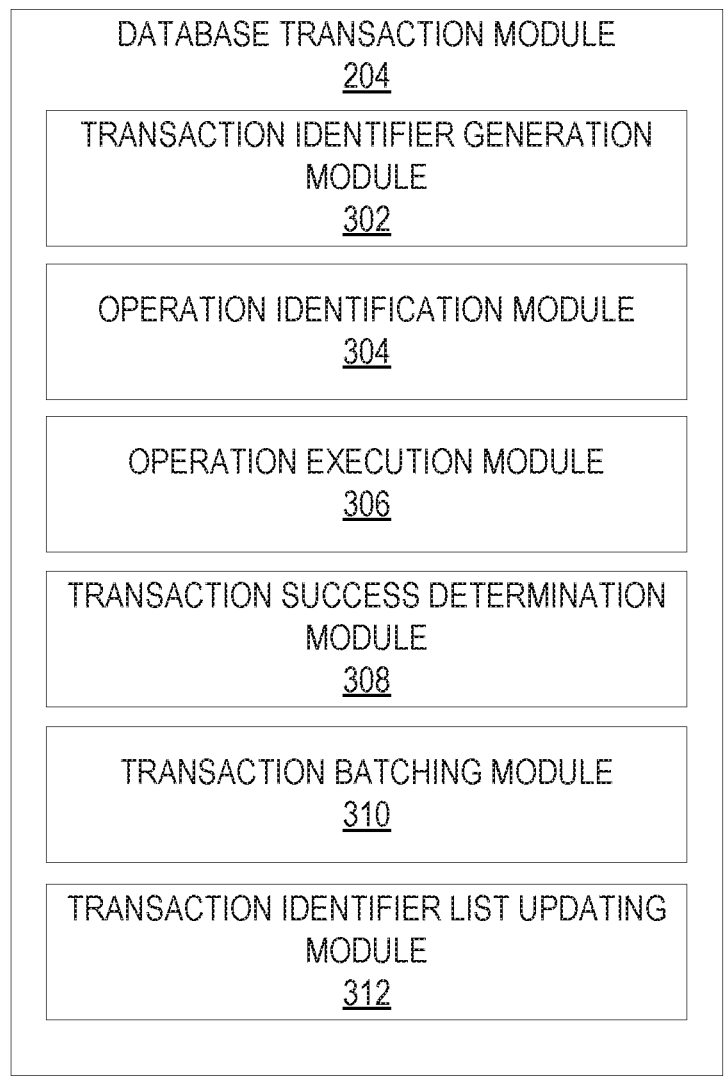
FIG. 3 is a block diagram of the database transaction module, according to some example embodiments.

FIG. 3 is a block diagram of the database transaction module 204, according to some example embodiments. To avoid obscuring the inventive subject matter with unnecessary detail, various functional components (e.g., modules) that are not germane to conveying an understanding of the inventive subject matter have been omitted from FIG. 3. However, a skilled artisan will readily recognize that various additional functional components may be supported by the database transaction module 204 to facilitate additional functionality that is not specifically described herein. Furthermore, the various functional modules depicted in FIG. 3 may reside on a single computing device or may be distributed across several computing devices in various arrangements such as those used in cloud-based architectures.

As shown, the database transaction module 204 includes a transaction identifier generation module 302, an operation identification module 304, an operation execution module 306, a transaction success determination module 308, a transaction batching module 310, and a transaction ID list updating module 312.

The transaction identifier generation module 302 generates a transaction ID for each new database transaction. Each transaction ID is a unique value (e.g., number) that is generated for and assigned to each new database transaction. The transaction identifier generation module 302 may generate the transaction IDs in increasing sequential order, such as by increasing the value of each newly generated transaction ID by one predetermined increment value (e.g., 1, 2, 3, 3, etc.).

The operation identification module 304 identifies the individual operations included in a requested database transaction. A database transaction is a single transaction that consists of multiple operations (e.g., write commands) that are either all successfully executed, or none are executed. The operation identification module 304 identifies the individual operations included in a requested database transaction and provides the individual operations to the operation execution module 306 for execution.

The operation execution module 306 attempts to execute each individual operation of the database transaction and adds the transaction ID assigned to the database transaction to each updated version of a data value written to the non-transactional database 108 that results from a successfully executed operation of the database transaction. For example, if a database transaction includes an operation to change a data value (e.g., number) in the non-transactional database 108, the operation execution module 306 attempts to write a new version of the data value in the non-transactional database 108. The previous versions of the data values are not affected or overwritten during this process. Rather, the operation execution module 306 adds a new version of the data value that includes the transaction ID for the corresponding database transaction. As a result, the non-transactional database 108 may include multiple versions of a data value.

The transaction success determination module 308 determines whether a database transaction was successfully committed. A database transaction is determined to be successfully committed if each of the operations of the database transaction was successfully executed. The operation execution module 306 notifies the transaction success determination module 308 upon successfully completing each operation of the database transaction. If the transaction success determination module 308 determines that each operation of the transaction was successfully executed, the transaction success determination module 308 determines that the database transaction was committed. Alternatively, if the transaction success determination module 308 determines that an operation failed, and/or a timeout occurs without receiving confirmation that all of the operations were successfully committed, the transaction success determination module 308 determines that the database transaction is uncommitted. The transaction success determination module 308 providers the transaction IDs for the committed database transactions to the transaction batching module 310.

The transaction batching module 310 batches committed transaction IDs received during a period of time. That is, the transaction batching module 310 gathers a set of transaction IDs for database transactions that are committed during the period of time, which are provided to transaction ID list updating module 312 at once to be added to the transaction ID list. Batching the committed transaction IDs allows the transaction batching module 310 to group sequentially continuous transaction IDs for committed transaction into single entries to be added to the transaction ID list. Sequentially continuous transactions IDs are a set of two or more transaction IDs that are sequential in order without any intervening transaction IDs that are not included in the set. Sequentially continuous transaction IDs (e.g., 1, 2, 3) may be grouped as a single entry that indicates the continuous range of the transaction IDs (e.g., 1-3). The transaction batching module 310 identifies groups of sequentially continuous transaction IDs and generates a single value indicating the range of the sequentially continuous transaction IDs. The transaction batching module 310 provides the committed transaction IDs to the updating module 312 to be added to the transaction ID list. The committed transaction IDs provided to the updating module 312 include the values indicating the ranges of the sequentially continuous transaction IDs rather than the individual transactions IDs included in the group of sequentially continuous transaction IDs.

The transaction ID list updating module 312 adds the received committed transaction IDs to the transaction ID list. For example, the transaction ID list updating module 312 communicates with the data storage 210 to access the transaction ID list. The transaction ID list updating module 312 adds a new entry in the transaction ID list that includes the committed transaction ID. The committed transaction IDs in the transaction ID list may be stored in sequential order, such as from a lowest value transaction ID to a highest value transaction ID. Accordingly, the transaction ID list updating module 312 may add the entry for the committed transaction ID based on the sequential ordering.

Figure 4:
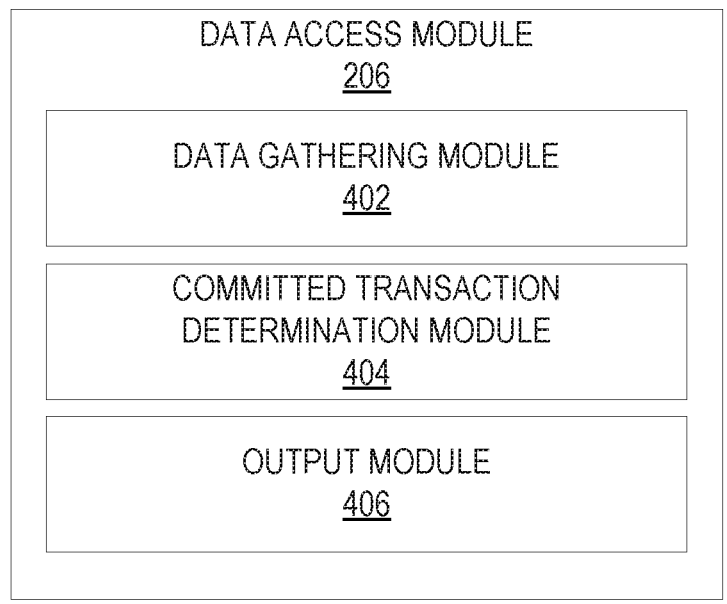
FIG. 4 is a block diagram of the data access module, according to some example embodiments.

FIG. 4 is a block diagram of the data access module 206, according to some example embodiments. To avoid obscuring the inventive subject matter with unnecessary detail, various functional components (e.g., modules) that are not germane to conveying an understanding of the inventive subject matter have been omitted from FIG. 4. However, a skilled artisan will readily recognize that various additional functional components may be supported by the data access module 206 to facilitate additional functionality that is not specifically described herein. Furthermore, the various functional modules depicted in FIG. 4 may reside on a single computing device or may be distributed across several computing devices in various arrangements such as those used in cloud-based architectures.

The data access module 206 accesses data from the non-transactional database 108. An example of accessing data is executing a read command to return a data value from the non-transactional database 108. As explained, the non-transactional database 108 may maintain multiple versions of a data value. Rather than deleting or writing over a previous version of a data item when modifying the data value, the database transaction module 204 adds a new version of the data value along with its corresponding transaction ID to the non-transactional database 108. The database access module 206 accesses any existing versions of the requested data value and determines which version of the data value should be returned.

As shown, the data access module 206 includes a data gathering module 402, a committed transaction determination module 404, and an output module 406. The data accessing module 206 accesses each version of a requested data value from the non-transactional database 108.

The committed transaction determination module 404 identifies the most recent version of the data value that is associated with a committed transaction ID. To determine whether a version of a data value is associated with a committed transaction ID, the committed transaction determination module 404 searches the transaction ID list for the transaction ID associate with the version of the data value. If the transaction ID is included in the transaction ID list, the committed transaction determination module 404 determines that the version of the data value is associated with a committed transaction ID. Alternatively, if transaction ID associated with a version of a data value is not included in the transaction ID list, the committed transaction determination module 404 determines that the version of the data value is not associated with a committed transaction ID.

The committed transaction determination module 404 may perform this query in reverse sequential order such that the committed transaction determination module 404 initially searches the transaction ID list for the transaction ID associated with the most recent version of the data value and then continues on to each previous version of the data value until a version of the data value that is associated with a committed transaction ID is found.

The committed transaction determination module 404 provides the most recent version of the data value associated with a committed transaction ID to the output module 406. The output module 406 then returns the identified data value in response to an access request.

Figure 5:
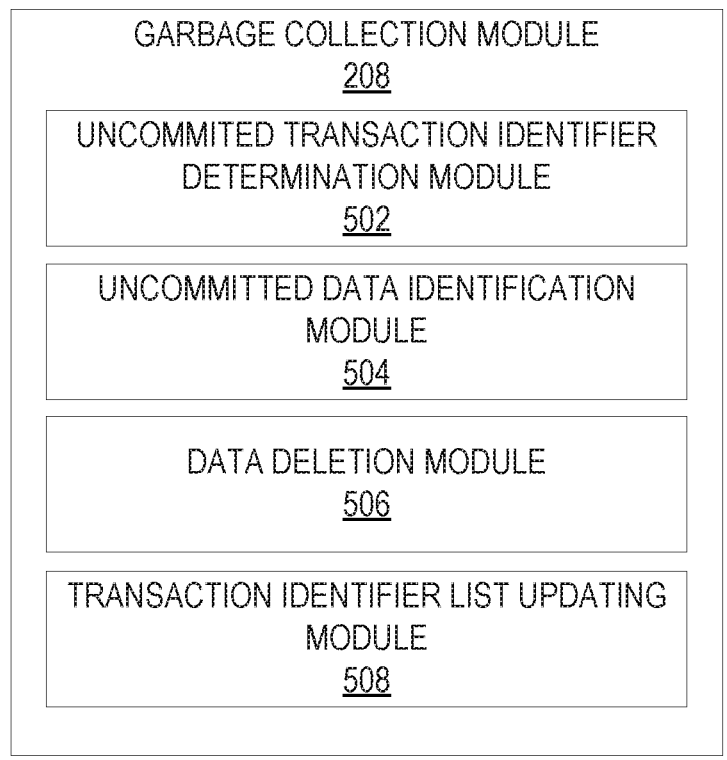
FIG. 5 is a block diagram of the garbage collection module, according to some example embodiments.

FIG. 5 is a block diagram of the garbage collection module 208, according to some example embodiments. To avoid obscuring the inventive subject matter with unnecessary detail, various functional components (e.g., modules) that are not germane to conveying an understanding of the inventive subject matter have been omitted from FIG. 5. However, a skilled artisan will readily recognize that various additional functional components may be supported by the garbage collection module 208 to facilitate additional functionality that is not specifically described herein. Furthermore, the various functional modules depicted in FIG. 5 may reside on a single computing device or may be distributed across several computing devices in various arrangements such as those used in cloud-based architectures.

The garbage collection module 208 performs garbage collection on the data values stored in the non-transactional database 108. Garbage collection is the process of deleting versions of data values in the non-transactional database 108 that are not needed. For example, versions of data values that are associated with uncommitted transactions may be periodically deleted to reduce and reclaim the data used by the non-transactional database 108. The garbage collection module 208 searches the non-transactional database 108 for versions of data values that are associated with uncommitted transaction IDs and deletes them.

As shown, the garbage collection module 208 includes an uncommitted transaction ID determination module 502, an uncommitted data identification module 504, a data deletion module 506, and a transaction ID list updating module 508.

To avoid deleting versions of data values that are associated with database transactions that are still being processed, the uncommitted transaction ID determination module 502 identifies a set of uncommitted transition IDs for the garbage collection process. For example, the uncommitted transaction ID determination module 502 may search the transaction ID list to identify a set of uncommitted transaction IDs or select a maximum transaction ID value for the garbage collection.

The uncommitted data identification module 504 identifies versions of data values that are associated with any of the set of uncommitted transaction IDs identified by the uncommitted transaction ID determination module 502. That is, the uncommitted data identification module 504 may search the non-transactional database 108 for versions of data values associated with transaction IDs included in the identified set of uncommitted transaction IDs or uncommitted transaction IDs that do not exceed the maximum transaction ID value. The data deletion module 506 then deletes the versions of the data values identified by the uncommitted data identification module 504.

After completing garbage collection, the transaction ID list updating module 508 modifies the transaction ID list to include the set of uncommitted transaction IDs that were deleted during the garbage collection process. Uncommitted transaction IDs result in gaps in the transaction ID list. The transaction ID list updating module 508 adds uncommitted transaction IDs to the transaction ID list after completing a garbage collection so that these gaps can be removed from the transaction ID list. As a result, multiple entries in the transaction ID list may be consolidated into a single entry, thereby greatly reducing the size of the transaction ID list. Adding the uncommitted transaction IDs to the transaction ID list may be performed by the transaction ID list updating module 508 after the garbage collection is completed and all versions of data values associated with the uncommitted transaction IDs have been deleted. Accordingly, the transaction ID list will no longer be queried for the uncommitted transaction ID.

Figure 6:
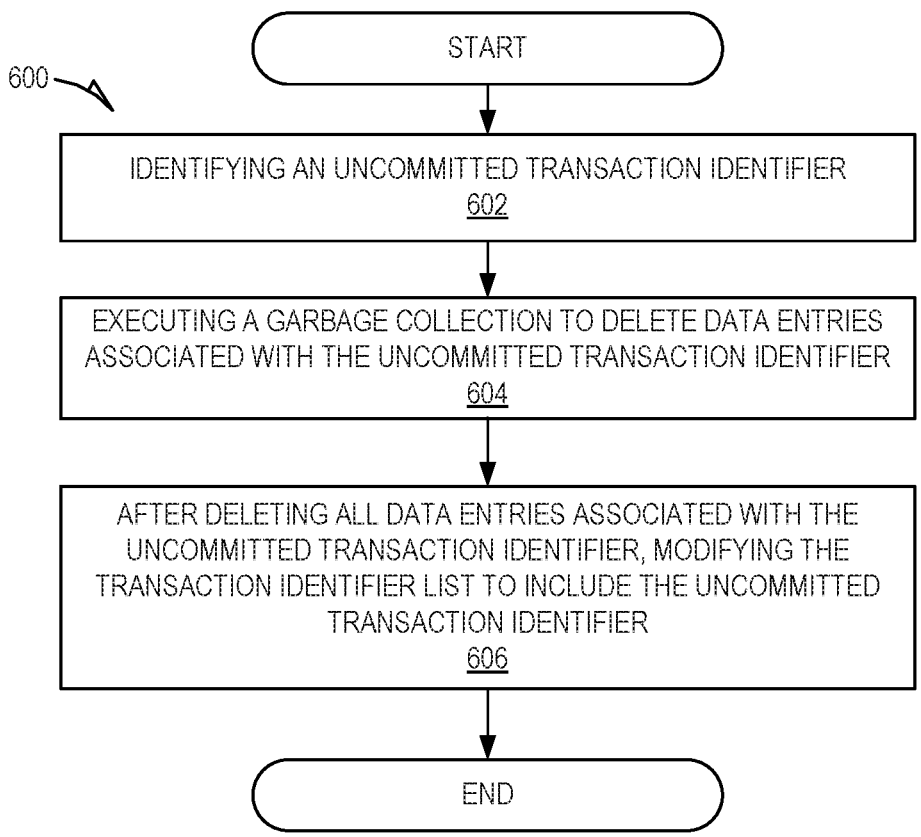
FIG. 6 is a flowchart showing an example method of providing transactions on a non-transactional database, according to certain example embodiments.

FIG. 6 is a flowchart showing an example method 600 of providing transactions on a non-transactional database, according to certain example embodiments. The method 600 may be embodied in computer readable instructions for execution by one or more processors such that the operations of the method 600 may be performed in part or in whole by the database management system 106; accordingly, the method 600 is described below by way of example with reference thereto. However, it shall be appreciated that at least some of the operations of the method 600 may be deployed on various other hardware configurations and the method 600 is not intended to be limited to the database management system 106.

At operation 602, the uncommitted transaction ID module 502 identifies an uncommitted transaction ID. To avoid deleting versions of data values that are associated with database transactions that are still being processed, the uncommitted transaction ID determination module 502 identifies a set of uncommitted transition IDs for the garbage collection process. For example, the uncommitted transaction ID determination module 502 may search the transaction ID list to identify a set of uncommitted transaction IDs or select a maximum transaction ID value for the garbage collection.

At operation 604, the garbage collection module 208 executes a garbage collection to delete data entries associated with the uncommitted transaction ID. For example, the uncommitted data identification module 504 first identifies versions of data values that are associated with any of the set of uncommitted transaction IDs identified by the uncommitted transaction ID determination module 502. That is, the uncommitted data identification module 504 may search the non-transactional database 108 for versions of data values associated with transaction IDs included in the identified set of uncommitted transaction IDs or uncommitted transaction IDs that do not exceed the maximum transaction ID value. The data deletion module 506 then deletes the versions of the data values identified by the uncommitted data identification module 504.

Figure 7:
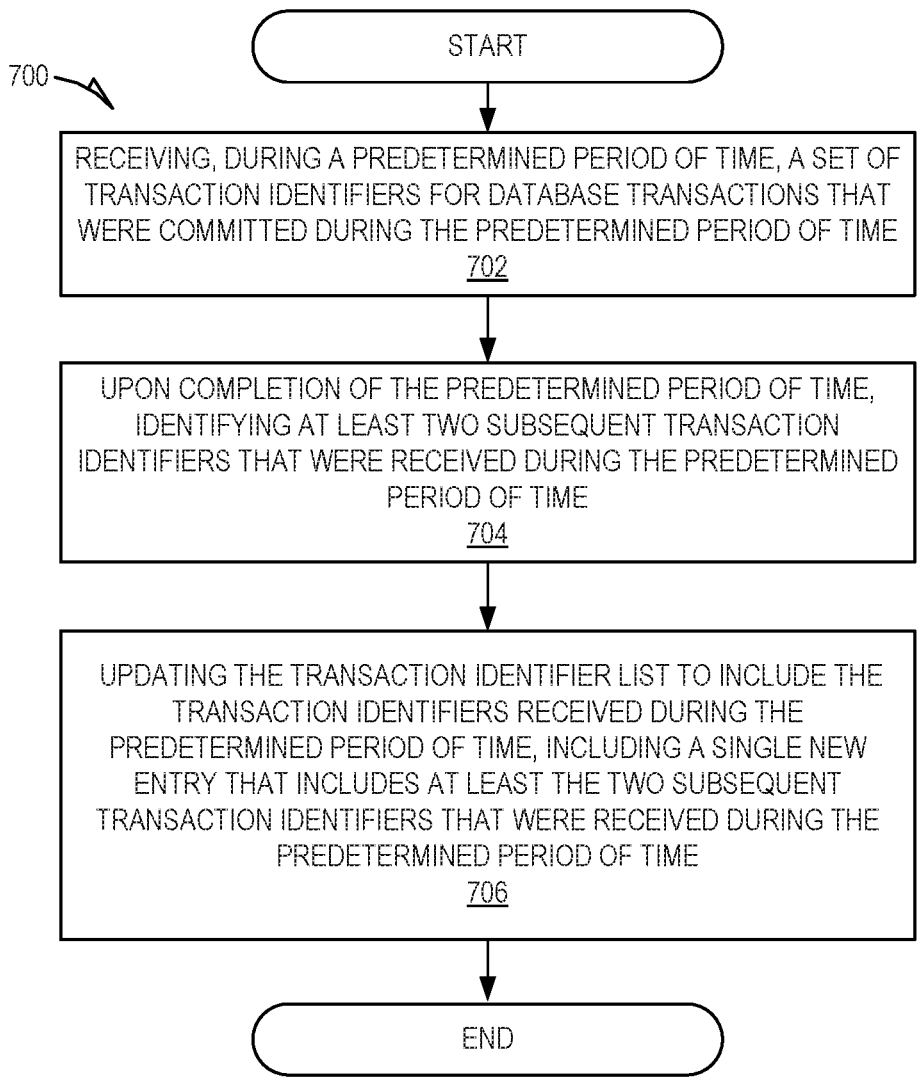
FIG. 7 is a flowchart showing an example method of batching transaction identifiers for committed transactions, according to certain example embodiments.

At operation 606, the transaction ID list updating module 508 modifies the transaction ID list to include the uncommitted transaction ID. Uncommitted transaction IDs result in gaps in the transaction ID list. The transaction ID list updating module 508 adds uncommitted transaction IDs to the transaction ID list after completing a garbage collection so that these gaps can be removed from the transaction ID list. As a result, multiple entries in the transaction ID list may be consolidated into a single entry, thereby greatly reducing the size of the transaction ID list. The transaction ID list updating module 508 performs the modification after deleting all data entries associated with the uncommitted transaction ID. Accordingly, the transaction ID list will no longer be queried for the uncommitted transaction ID FIG. 7 is a flowchart showing an example method 700 of batching transaction identifiers for committed transactions, according to certain example embodiments. The method 700 may be embodied in computer readable instructions for execution by one or more processors such that the operations of the method 700 may be performed in part or in whole by the database management system 106; accordingly, the method 700 is described below by way of example with reference thereto. However, it shall be appreciated that at least some of the operations of the method 700 may be deployed on various other hardware configurations and the method 700 is not intended to be limited to the database management system 106.

At operation 702, the transaction batching module 310 receives, during a predetermined period of time, a set of transaction IDs for database transactions that were committed during the period of time. The batched transaction IDs are written to the transaction ID list at one time, rather than individually when received.

Batching the committed transaction IDs allows the transaction batching module 310 to group sequentially continuous transaction IDs for committed transaction into single entries to be added to the transaction ID list. Accordingly, upon completion of the predetermined period of time, at operation 704, the batching module 310 identifies at least two subsequent transaction IDs that were received during the predetermined period of time. Sequentially continuous transactions IDs are a set of two or more transaction IDs that are sequential in order without any intervening transaction IDs that are not included in the set. Sequentially continuous transaction IDs (e.g., 1, 2, 3) may be grouped as a single entry that indicates the continuous range of the transaction IDs (e.g., 1-3). The transaction batching module 310 identifies groups of sequentially continuous transaction IDs and generates a single value indicating the range of the sequentially continuous transaction IDs.

At operation 706, the transaction ID list updating module 312 updates the transaction ID list to include the transaction IDs received during the predetermined period of time. For example, the transaction ID list updating module 312 communicates with the data storage 210 to access the transaction ID list. The transaction ID list updating module 312 adds new entries to the transaction ID list that includes the committed transaction IDs. The new entries include a single entry that includes at least the two subsequent transaction IDs that were received during the predetermined period of time. That is, the single entry represents a span of transaction IDs that includes the two subsequent transaction IDs. This is in contract to including a separate entry for each committed transaction ID. The committed transaction IDs in the transaction ID list may be stored in sequential order, such as from a lowest value transaction ID to a highest value transaction ID. Accordingly, the transaction ID list updating module 312 may add the entries for the committed transaction ID based on the sequential ordering.

Software Architecture

Figure 8:
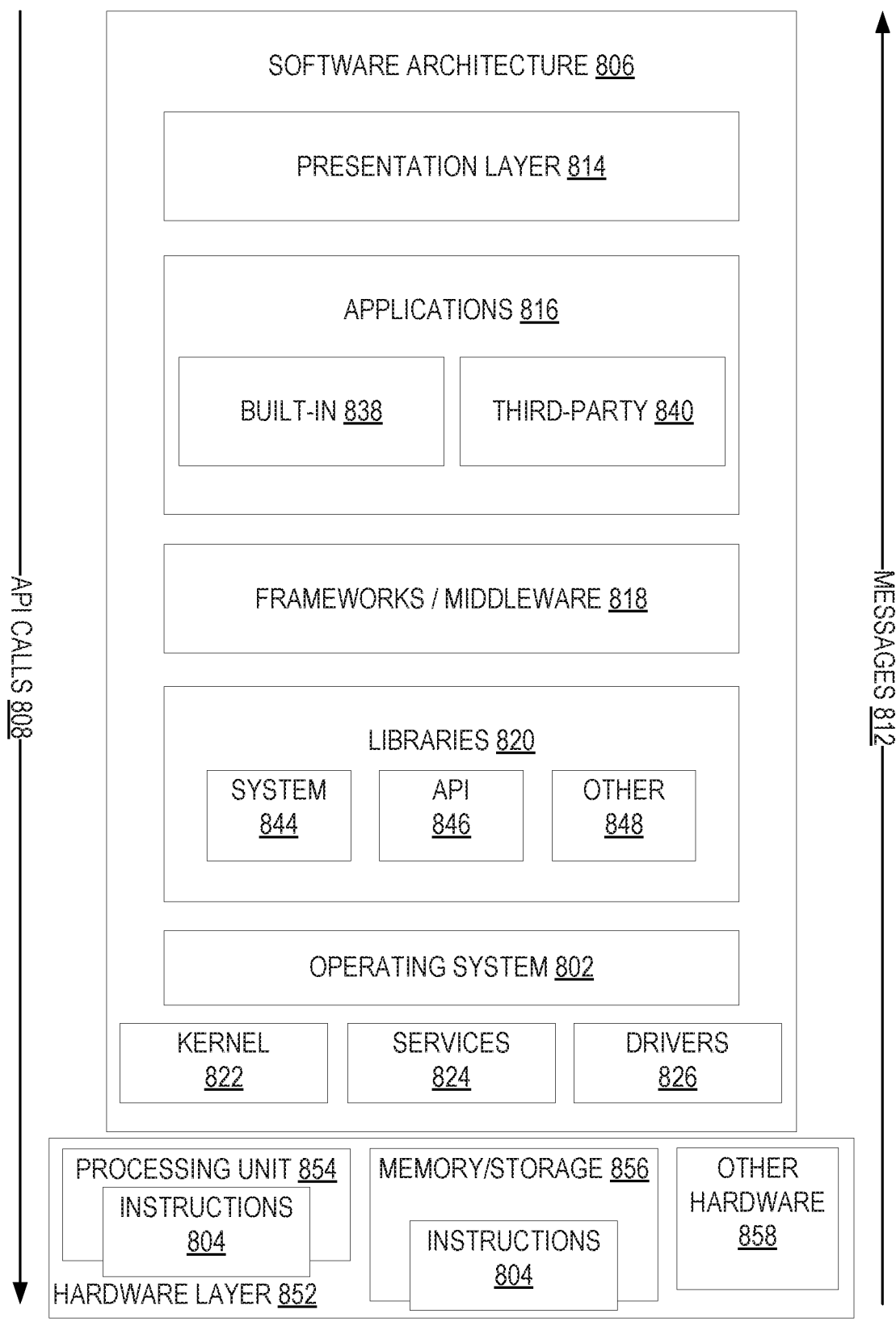
FIG. 8 is a block diagram illustrating a representative software architecture, which may be used in conjunction with various hardware architectures herein described.

FIG. 8 is a block diagram illustrating an example software architecture 806, which may be used in conjunction with various hardware architectures herein described. FIG. 8 is a non-limiting example of a software architecture 806 and it will be appreciated that many other architectures may be implemented to facilitate the functionality described herein. The software architecture 806 may execute on hardware such as machine 900 of FIG. 9 that includes, among other things, processors 904, memory 914, and (input/output) I/O components 918. A representative hardware layer 852 is illustrated and can represent, for example, the machine 900 of FIG. 9. The representative hardware layer 852 includes a processing unit 854 having associated executable instructions 804. Executable instructions 804 represent the executable instructions of the software architecture 806, including implementation of the methods, components, and so forth described herein. The hardware layer 852 also includes memory and/or storage modules 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, frameworks/middleware 818, applications 816, and a presentation layer 814. Operationally, the applications 816 and/or other components within the layers may invoke Application Programming Interface (API) calls 808 through the software stack and receive a response such as messages 812 in response to the API calls 808. The layers illustrated are representative in nature and not all software architectures have all layers. For example, some mobile or special purpose operating systems may not provide a frameworks/middleware 818, while others may provide such a layer. Other software architectures may include additional or different layers.

The operating system 802 may manage hardware resources and provide common services. The operating system 802 may include, for example, a kernel 822, services 824, and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth, depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824, and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphical user interface (GUI) functions, high-level resource management, high-level location services, and so forth. The frameworks/middleware 818 may provide a broad spectrum of other APIs that may be used by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824, and/or drivers 826), libraries 820, and frameworks/middleware 818 to create UIs to interact with users of the system. Alternatively, or additionally, in some systems, interactions with a user may occur through a presentation layer, such as presentation layer 814. In these systems, the application/component "logic" can be separated from the aspects of the application/component that interact with a user.

Figure 9:
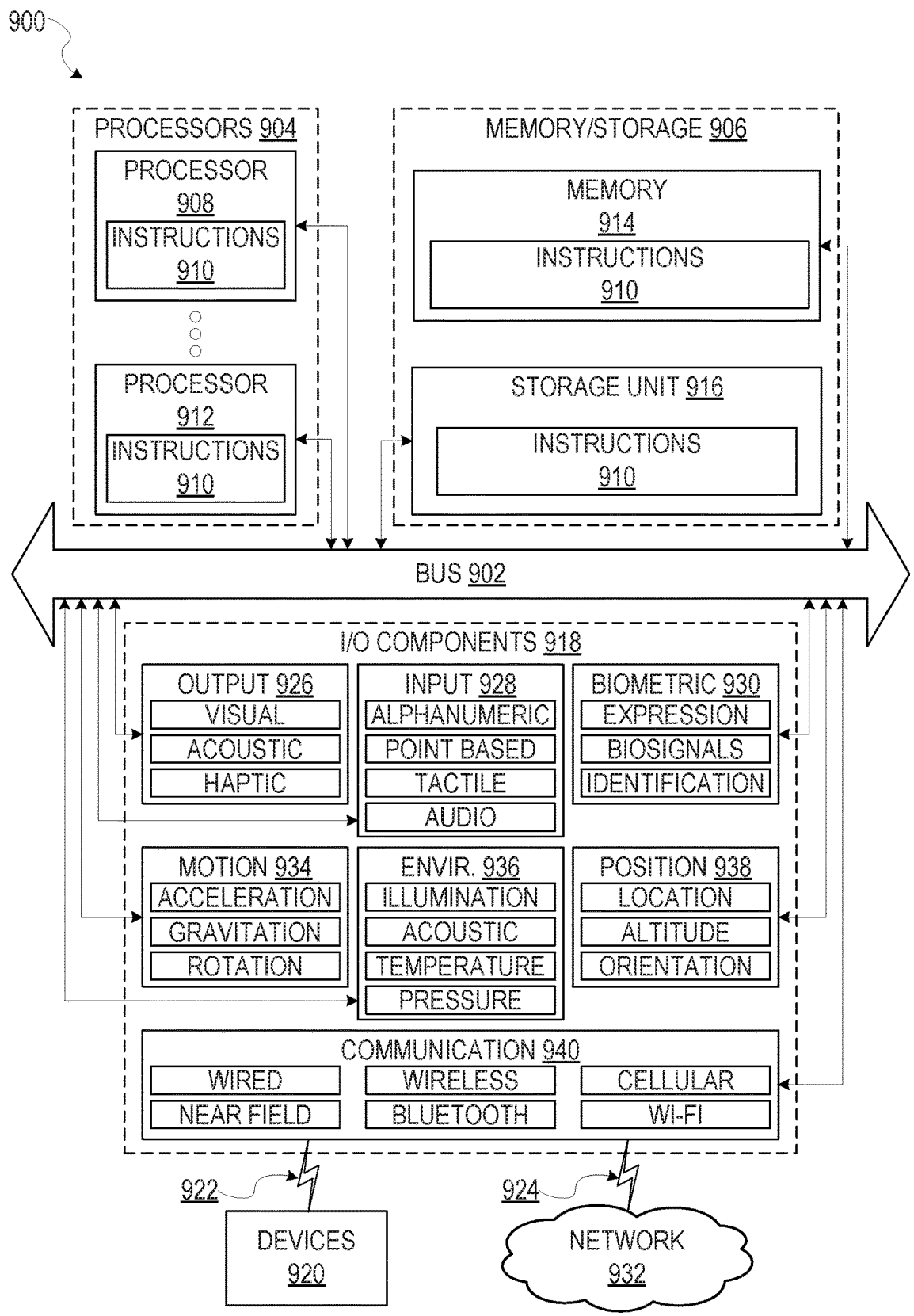
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions 804 from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine 900 capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental components 936, or position components 938 among a wide array of other components. For example, the biometric components 930 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environmental components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 938 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 924 and coupling 922, respectively. For example, the communication components 940 may include a network interface component or other suitable device to interface with the network 932. In further examples, communication components 940 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a USB).

Moreover, the communication components 940 may detect identifiers or include components operable to detect identifiers. For example, the communication components 940 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CARRIER SIGNAL" in this context refers to any intangible medium that is capable of storing, encoding, or carrying instructions 910 for execution by the machine 900, and includes digital or analog communications signals or other intangible medium to facilitate communication of such instructions 910. Instructions 910 may be transmitted or received over the network 932 using a transmission medium via a network interface device and using any one of a number of well-known transfer protocols.

"CLIENT DEVICE" in this context refers to any machine 900 that interfaces to a communications network 932 to obtain resources from one or more server systems or other client devices. A client device 102, 104 may be, but is not limited to, mobile phones, desktop computers, laptops, PDAs, smart phones, tablets, ultra books, netbooks, laptops, multi-processor systems, microprocessor-based or programmable consumer electronics, game consoles, STBs, or any other communication device that a user may use to access a network 932.

"COMMUNICATIONS NETWORK" in this context refers to one or more portions of a network 932 that may be an ad hoc network, an intranet, an extranet, a virtual private network (VPN), a LAN, a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network 932 or a portion of a network 932 may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"MACHINE-READABLE MEDIUM" in this context refers to a component, device or other tangible media able to store instructions 910 and data temporarily or permanently and may include, but is not be limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store instructions 910. The term "machine-readable medium" shall also be taken to include any medium, or combination of multiple media, that is capable of storing instructions 910 (e.g., code) for execution by a machine 900, such that the instructions 910, when executed by one or more processors 904 of the machine 900, cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors 904) may be configured by software (e.g., an application 816 or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor 904 or other programmable processor 904. Once configured by such software, hardware components become specific machines 900 (or specific components of a machine 900) uniquely tailored to perform the configured functions and are no longer general-purpose processors 904. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor 904 configured by software to become a special-purpose processor, the general-purpose processor 904 may be configured as respectively different special-purpose processors (e.g., comprising different hardware components) at different times. Software accordingly configures a particular processor or processors 904, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses 902) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors 904 that are temporarily configured (e.g., by software) or permanently configured to perform the relevant operations. Whether temporarily or permanently configured, such processors 904 may constitute processor-implemented components that operate to perform one or more operations or functions described herein. As used herein, "processor-implemented component" refers to a hardware component implemented using one or more processors 904. Similarly, the methods described herein may be at least partially processor-implemented, with a particular processor or processors 904 being an example of hardware. For example, at least some of the operations of a method may be performed by one or more processors 904 or processor-implemented components. Moreover, the one or more processors 904 may also operate to support performance of the relevant operations in a "cloud computing" environment or as a "software as a service" (SaaS). For example, at least some of the operations may be performed by a group of computers (as examples of machines 900 including processors 904), with these operations being accessible via a network 932 (e.g., the Internet) and via one or more appropriate interfaces (e.g., an API). The performance of certain of the operations may be distributed among the processors 904, not only residing within a single machine 900, but deployed across a number of machines 900. In some example embodiments, the processors 904 or processor-implemented components may be located in a single geographic location (e.g., within a home environment, an office environment, or a server farm). In other example embodiments, the processors 904 or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands," "op codes," "machine code," etc.) and which produces corresponding output signals that are applied to operate a machine 900. A processor 904 may be, for example, a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC) or any combination thereof. A processor may further be a multi-core processor having two or more independent processors 904 (sometimes referred to as "cores") that may execute instructions 910 contemporaneously.

What is claimed is:

1. A method comprising:
  executing, by one or more processors, a garbage collection operation on data stored in a database to delete data values written to the database as part of uncommitted transactions, each uncommitted transaction being associated with a respective transaction identifier that is not included in a list of committed transaction identifiers, the list of committed transaction identifiers listing, in sequential order, transaction identifiers for committed transaction; and
  after executing the garbage collection operation on the data stored in the database to delete each data value written to the database as part of a first uncommitted transaction, modifying, by the one or more processors, the list of committed transaction identifiers to include a transaction identifier for the first uncommitted transaction.

2. The method of claim 1, wherein modifying the list of committed transaction identifiers to include the transaction identifier for the first uncommitted transaction comprises:
  identifying a first entry in the list of committed transaction identifiers for a first transaction identifier that is less than the transaction identifier for the first uncommitted transaction;
  identifying a second entry in the list of committed transaction identifiers for a second transaction identifier that is greater than the transaction identifier for the first uncommitted transaction; and
  merging the first entry and the second entry into a single entry that includes a range of transaction identifiers, the range of transaction identifiers including the first transaction identifier, the second transaction identifier, and the transaction identifier for the first uncommitted transaction.

3. The method of claim 1, further comprising:
  identifying one or more versions of data written to the database for each of the uncommitted transactions, wherein the garbage collection operation deletes the one or more versions of the data written to the database for each of the uncommitted transactions that are associated with respective transaction identifiers that are no greater than a maximum transaction identifier.

4. The method of claim 1, further comprising:
  receiving a first confirmation that a first transaction has been committed, the first transaction being associated with a first transaction identifier;
  during a predetermined time period after receiving the first confirmation, receiving a second confirmation that a second transaction has been committed, the second transaction being associated with a second transaction identifier that is sequentially subsequent to the first transaction identifier; and
  updating the list of committed transaction identifiers to include a new entry that includes a range of transaction identifiers, the range of transaction identifiers including at least the first transaction identifier and the second transaction identifier.

5. The method of claim 1, further comprising:
  receiving a request to execute a new transaction to the database;
  generating a new transaction identifier for the new transaction;
  determining at least a first data operation and a second data operation that are included as part of the new transaction; and
  executing the first data operation and the second data operation.

6. The method of claim 5, further comprising:
  determining that the first data operation and the second data operation were successfully executed; and
  updating the list of committed transaction identifiers to include the new transaction identifier.

7. The method of claim 5, further comprising:
  determining that the first data operation was not successfully executed, wherein the list of committed transaction identifiers is not updated to include the new transaction identifier as a result of determining that the first data operation was not successfully executed.

8. A database management system comprising:
  one or more computer processors; and
  one or more computer-readable mediums storing instructions that, when executed by the one or more computer processors, cause the database management system to perform operations comprising:
    executing a garbage collection operation on data stored in a database to delete data values written to the database as part of uncommitted transactions, each uncommitted transaction being associated with a respective transaction identifier that is not included in a list of committed transaction identifiers, the list of committed transaction identifiers listing, in sequential order, transaction identifiers for committed transaction; and
    after executing the garbage collection operation on the data stored in the database to delete each data value written to the database as part of a first uncommitted transaction, modifying the list of committed transaction identifiers to include a transaction identifier for the first uncommitted transaction.

9. The database management system of claim 8, wherein modifying the list of committed transaction identifiers to include the transaction identifier for the first uncommitted transaction comprises:
   identifying a first entry in the list of committed transaction identifiers for a first transaction identifier that is less than the transaction identifier for the first uncommitted transaction;
   identifying a second entry in the list of committed transaction identifiers for a second transaction identifier that is greater than the transaction identifier for the first uncommitted transaction; and
   merging the first entry and the second entry into a single entry that includes a range of transaction identifiers, the range of transaction identifiers including the first transaction identifier, the second transaction identifier, and the transaction identifier for the first uncommitted transaction.

10. The database management system of claim 8, the operations further comprising:
   identifying one or more versions of data written to the database for each of the uncommitted transactions, wherein the garbage collection operation deletes the one or more versions of the data written to the database for each of the uncommitted transactions that are associated with respective transaction identifiers that are no greater than a maximum transaction identifier.

11. The database management system of claim 8, the operations further comprising:
   receiving a first confirmation that a first transaction has been committed, the first transaction being associated with a first transaction identifier;
   during a predetermined time period after receiving the first confirmation, receiving a second confirmation that a second transaction has been committed, the second transaction being associated with a second transaction identifier that is sequentially subsequent to the first transaction identifier; and
   updating the list of committed transaction identifiers to include a new entry that includes a range of transaction identifiers, the range of transaction identifiers including at least the first transaction identifier and the second transaction identifier.

12. The database management system of claim 8, the operations further comprising:
   receiving a request to execute a new transaction to the database;
   generating a new transaction identifier for the new transaction;
   determining at least a first data operation and a second data operation that are included as part of the new transaction; and
   executing the first data operation and the second data operation.

13. The database management system of claim 12, the operations further comprising:
   determining that the first data operation and the second data operation were successfully executed; and
   updating the list of committed transaction identifiers to include the new transaction identifier.

14. The database management system of claim 12, the operations further comprising:
   determining that the first data operation was not successfully executed, wherein the list of committed transaction identifiers is not updated to include the new transaction identifier as a result of determining that the first data operation was not successfully executed.

15. A non-transitory computer-readable medium storing instructions that, when executed by one or more computer processors of a database management system, cause the database management system to perform operations comprising:
   executing a garbage collection operation on data stored in a database to delete data values written to the database as part of uncommitted transactions, each uncommitted transaction being associated with a respective transaction identifier that is not included in a list of committed transaction identifiers, the list of committed transaction identifiers listing, in sequential order, transaction identifiers for committed transaction; and
   after executing the garbage collection operation on the data stored in the database to delete each data value written to the database as part of a first uncommitted transaction, modifying the list of committed transaction identifiers to include a transaction identifier for the first uncommitted transaction.

16. The non-transitory computer-readable medium of claim 15, wherein modifying the list of committed transaction identifiers to include the transaction identifier for the first uncommitted transaction comprises:
   identifying a first entry in the list of committed transaction identifiers for a first transaction identifier that is less than the transaction identifier for the first uncommitted transaction;
   identifying a second entry in the list of committed transaction identifiers for a second transaction identifier that is greater than the transaction identifier for the first uncommitted transaction; and
   merging the first entry and the second entry into a single entry that includes a range of transaction identifiers, the range of transaction identifiers including the first transaction identifier, the second transaction identifier, and the transaction identifier for the first uncommitted transaction.

17. The non-transitory computer-readable medium of claim 15, the operations further comprising:
   identifying one or more versions of data written to the database for each of the uncommitted transactions, wherein the garbage collection operation deletes the one or more versions of the data written to the database for each of the uncommitted transactions that are associated with respective transaction identifiers that are no greater than a maximum transaction identifier.

18. The non-transitory computer-readable medium of claim 15, the operations further comprising:
   receiving a first confirmation that a first transaction has been committed, the first transaction being associated with a first transaction identifier;
   during a predetermined time period after receiving the first confirmation, receiving a second confirmation that a second transaction has been committed, the second transaction being associated with a second transaction identifier that is sequentially subsequent to the first transaction identifier; and
   updating the list of committed transaction identifiers to include a new entry that includes a range of transaction identifiers, the range of transaction identifiers including at least the first transaction identifier and the second transaction identifier.

19. The non-transitory computer-readable medium of claim 15, the operations further comprising:
receiving a request to execute a new transaction to the database;
generating a new transaction identifier for the new transaction;
determining at least a first data operation and a second data operation that are included as part of the new transaction;
executing the first data operation and the second data operation;
determining that the first data operation and the second data operation were successfully executed; and
updating the list of committed transaction identifiers to include the new transaction identifier.

20. The non-transitory computer-readable medium of claim 15, the operations further comprising:
receiving a request to execute a new transaction to the database;
generating a new transaction identifier for the new transaction;
determining at least a first data operation and a second data operation that are included as part of the new transaction;
executing the first data operation and the second data operation; and
determining that the first data operation was not successfully executed, wherein the list of committed transaction identifiers is not updated to include the new transaction identifier as a result of determining that the first data operation was not successfully executed.

* * * * *